US007433762B2

(12) United States Patent
Dykstra (10) Patent No.: US 7,433,762 B2
(45) Date of Patent: Oct. 7, 2008

(54) METHODS FOR CONTROLLING MULTIPLE ACTUATORS

(75) Inventor: Jason D. Dykstra, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 469 days.

(21) Appl. No.: 11/053,474

(22) Filed: Feb. 8, 2005

(65) Prior Publication Data

US 2006/0177203 A1 Aug. 10, 2006

(51) Int. Cl.
*G05D 7/06* (2006.01)
(52) U.S. Cl. .................. 700/282; 318/561; 318/610; 388/906; 700/42
(58) Field of Classification Search ......... 361/160; 137/92; 388/803, 906; 700/282, 42; 417/279; 60/696; 318/139, 561; 62/132, 228.1
See application file for complete search history.

(56) References Cited

U.S. PATENT DOCUMENTS

| | | | | |
|---|---|---|---|---|
| 3,646,754 A * | 3/1972 | Koch et al. ............ 60/390 |
| 4,031,404 A * | 6/1977 | Martz et al. .......... 290/40 R |
| 4,485,794 A * | 12/1984 | Kimberley et al. ...... 123/681 |
| 4,496,077 A * | 1/1985 | Zuehlsdorf ............ 222/61 |
| 4,687,946 A * | 8/1987 | Jones .................. 290/40 R |
| 5,107,193 A | 4/1992 | Iwashita .............. 318/560 |
| 5,119,005 A | 6/1992 | Tsai et al. ............ 318/618 |
| 5,119,988 A * | 6/1992 | Fiedrich .............. 237/8 C |
| 5,388,761 A | 2/1995 | Langeman ............. 239/1 |
| 5,519,605 A * | 5/1996 | Cawlfield ............. 700/31 |
| 5,789,879 A | 8/1998 | Cook ................. 318/101 |
| 6,056,510 A | 5/2000 | Miura et al. .......... 417/2 |
| 6,199,441 B1 * | 3/2001 | Kanenobu et al. ....... 74/331 |
| 6,280,002 B1 * | 8/2001 | Goodzey et al. ........ 303/3 |
| 6,457,306 B1 | 10/2002 | Abel et al. ........... 60/204 |
| 7,130,721 B2 * | 10/2006 | Wear et al. ........... 700/282 |
| 2005/0164570 A1 * | 7/2005 | Colyvas .............. 440/39 |
| 2006/0095163 A1 * | 5/2006 | Wear et al. ........... 700/282 |

OTHER PUBLICATIONS

Patent Application entitled "Methods and Systems for Controlling Rate and Output of Heat Exchanger Fluids" by Jason D. Dykstra, U.S. Appl. No. 11/000,787, filed Nov. 30, 2004.
Patent Application entitled "Systems for Controlling Multiple Actuators" by Jason D. Dykstra, U.S. Appl. No. 11/053,139, filed Feb. 8, 2005.

* cited by examiner

*Primary Examiner*—Walter Benson
*Assistant Examiner*—Antony M Paul
(74) *Attorney, Agent, or Firm*—John W. Wustenberg; Groover and Associates (57) ABSTRACT

Methods for controlling at least two actuators are provided. An internal control system sends an input received from the main control system to a first actuator and diverts a portion of the input to a second actuator when an input constraint of the first actuator is reached. The actuators may be throttle valves for heating a hydraulic line. The internal control system includes a cutoff rerouter for implementing the sending and the diverting of the input and an adaptive cutoff controller, e.g., an integral controller, for determining the input constraint of the first actuator.

19 Claims, 9 Drawing Sheets

METHODS FOR CONTROLLING MULTIPLE ACTUATORS

FIELD OF THE INVENTION

The present invention generally relates to process control, and more particularly to methods for controlling multiple actuators having independent constraints such that the actuators appear as one actuator to a main control system.

BACKGROUND OF THE INVENTION

The following paragraphs contain some discussion, which is illuminated by the innovations disclosed in this application, and any discussion of actual or proposed or possible approaches in this Background section does not imply that those approaches are prior art.

Figure 1:
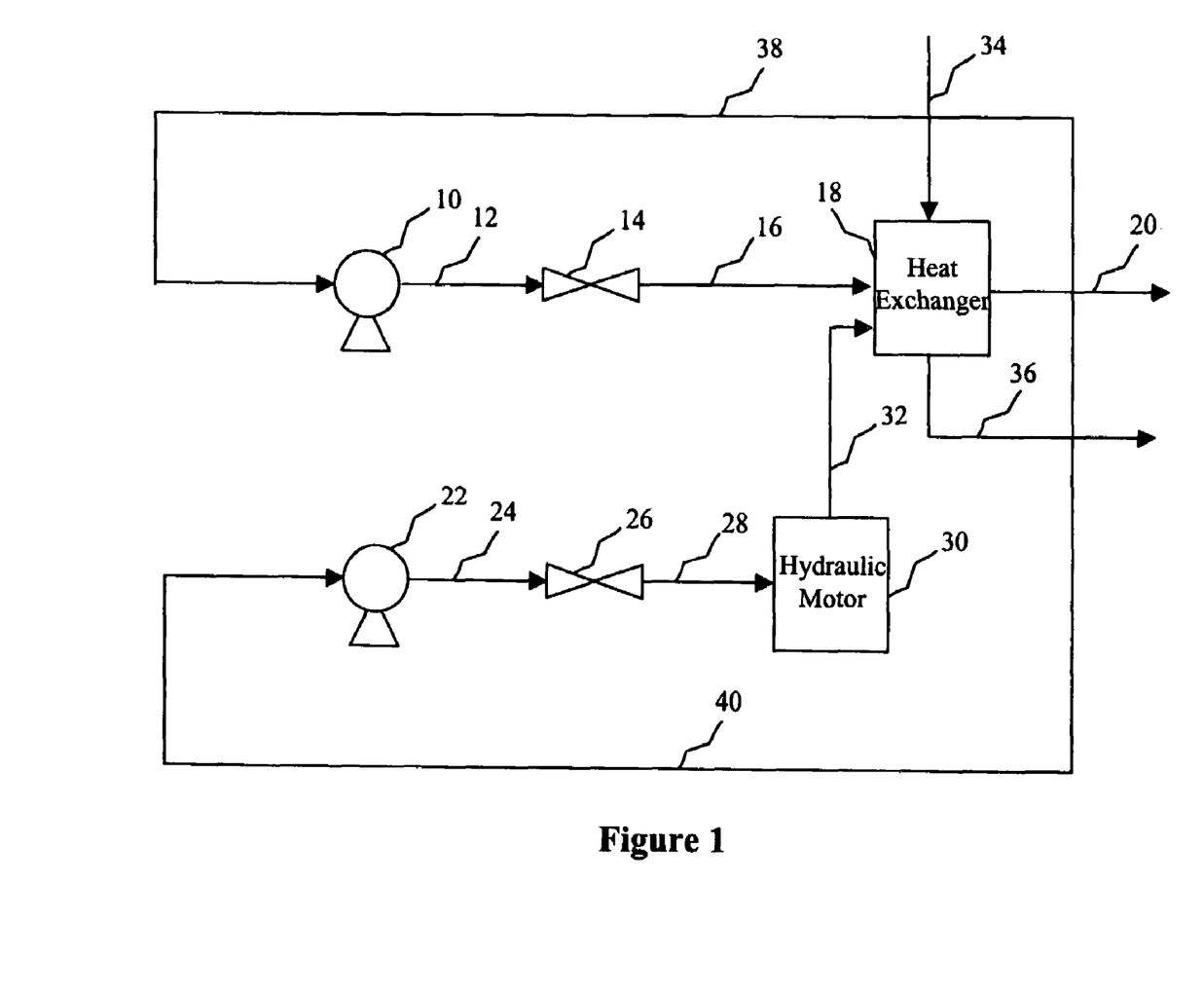
FIG. 1 is a process flow diagram in which a heat transfer fluid is heated by passing it through two valves and is then passed to a heat exchanger for heating a nitrogen stream.

Various chemical processes may require multiple actuators to supply an input for a main controlled parameter. FIG. 1 illustrates such a process in which two valves 14 and 26 serve as actuators that supply heat to a nitrogen ($N_2$) pumping unit for maintaining the temperature of the $N_2$ at a desired setpoint. In this process, pumps 10 and 22 are utilized to convey a heat transfer fluid such as water to respective valves 14 and 26 via respective streams 12 and 24. Pumps 10 and 22 may be, for example, positive displacement pumps. Valves 14 and 26 are desirably heat throttle valves, each having a high pressure side near its inlet and a low pressure side near its outlet. Thus, the temperature of the heat transfer fluid increases as it passes through each valve. The heat transfer fluid exiting valve 14 is conveyed directly to a heat exchanger 18 via stream 16, whereas the heat transfer fluid exiting valve 26 is conveyed to a hydraulic motor 30 via hydraulic line 28 before being passed on to heat exchanger 18 via stream 32. A $N_2$ line 34 is also pumped to heat exchanger 18. Within heat exchanger 18, energy may be transferred from the heat transfer fluid to the $N_2$, thereby causing the temperature of the $N_2$ to increase. Further, at least a portion of the heat transfer fluid stream 20 that exits heat exchanger 18 may be recycled back to respective pumps 10 and 12 via respective recycle streams 38 and 40.

Controlling a multiple actuator process can be very difficult. Each actuator may have independent constraints that may be affected by outside criteria. For example, an independent constraint of a valve is its maximum pressure, which is a function of its position and of the viscosity of the fluid passing through the valve. In a conventional process control system, an input or driving signal may be transmitted to a first actuator until its maximum constraint is reached. At that point, a hard stop occurs in which the input is suddenly diverted to the next actuator. Unfortunately, hard stops may degrade the performance of the controller being employed in the process control system. A need therefore exists to develop a control system to control multiple actuators having independent constraints without subjecting the system to hard stops.

SUMMARY OF THE INVENTION

Some teachings and advantages found in the present application are summarized briefly below. However, note that the present application may disclose multiple embodiments, and not all of the statements in this Summary section necessarily relate to all of those embodiments. Moreover, none of these statements limit the claims in any way.

In embodiments, methods of controlling at least two actuators comprise: sending an input received from a main control system to a first actuator; and diverting a portion of the input to a second actuator when an input constraint of the first actuator is reached. The actuators may be throttle valves for heating a hydraulic line. The size of the diverted portion of the input may be equivalent to the difference between the input and an input constraint determined by an adaptive cutoff controller. A signal being fed to the adaptive cutoff controller comprises the input divided by an output from the first actuator. The adaptive cutoff controller may comprise, for example, an integral controller.

In additional embodiments, methods of controlling at least two actuators comprise: determining if an input received from a main control system is greater than an input constraint of a first actuator; diverting a portion of the input to a second actuator when the input is greater than the input constraint; and sending an undiverted portion of the input to the first actuator. The input constraint of the first actuator may be calculated based on the input/output response slope. The methods also include determining an amount by which to offset the input being fed to the first actuator when the output of the first actuator is greater than a predetermined output constraint of the first actuator.

In still more embodiments, methods of controlling at least two actuators comprise using an internal control system that receives an input from a main control system to control at least two actuators such that eigenvalues of the internal control system remain substantially constant during its operation.

DETAILED DESCRIPTION OF THE INVENTION

Two or more actuators having independent constraints may be controlled to supply an input for a main controlled parameter. As described previously, FIG. 1 depicts a flow diagram of an exemplary process utilizing two valves, i.e., actuators, to heat a nitrogen stream being employed in a nitrogen pumping unit to a desired temperature. By way of example, the nitrogen may be used in various downhole operations such as cementing or fracturing. A desired temperature of the nitrogen may be in a range of from about 60° F. to about 120° F., and a desired pressure of the nitrogen may be less than or equal to about 15,000 psi.

An internal control system may be used to control the actuators such that they appear as one actuator to a main control system even though each actuator has its own independent constraints. In particular, the internal control system may send an input received from the main control system to a first actuator but divert a portion of that input to a second actuator when an input constraint of the first actuator is reached. It may further divert a portion of the input being sent to the second actuator to a third actuator when an input constraint of the second actuator is reached and so forth for as many actuators present. As a result, large changes in the eigenvalues, i.e., the parameters that define the internal control system, are mitigated, and a hard stop that could otherwise degrade the controllers of the system is avoided. Thus, the eigenvalues of the internal control system remain substantially constant during the operation thereof. The input serves to control operating parameters of the actuators. For example, if an actuator is a valve, it may control the size of the opening through the interior of the valve.

Figure 2:
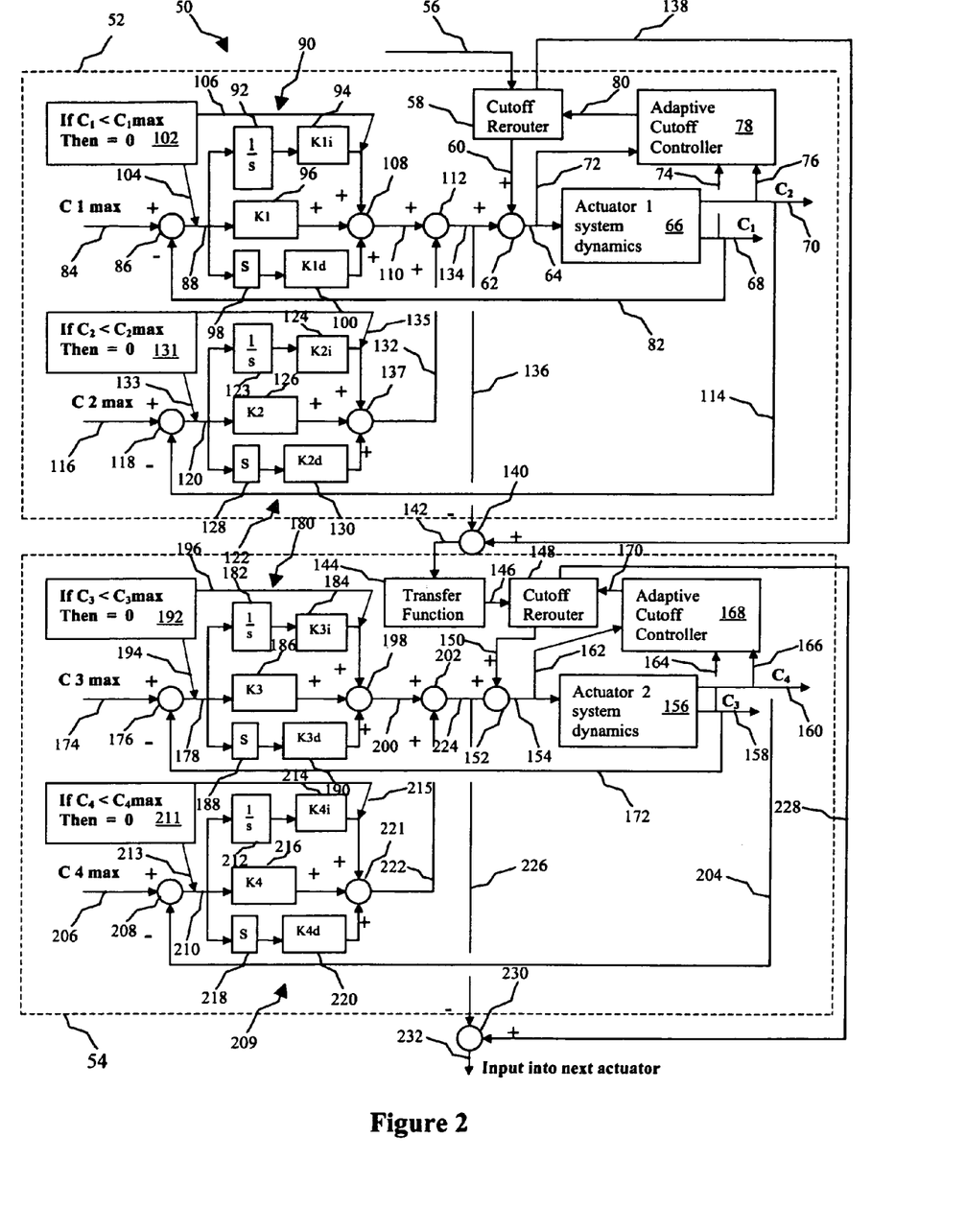
FIG. 2 is a schematic diagram of an embodiment of an internal control system for controlling the valves depicted in FIG. 1.

FIG. 2 illustrates an embodiment of a suitable internal control system 50 for controlling multiple actuators such that they appear as one actuator to a main control system. In an embodiment, the actuators may be valves such as the throttle valves shown in FIG. 1. The internal control system 50 includes a first actuator control system (represented by dotted line 52) and a second actuator control system (represented by dotted line 54). It is understood that internal control system 50 may include additional control systems when additional actuators are employed in a particular process. An input generated by a main control system (not shown) may first be sent to a cutoff rerouter 58 via driving signal 56, which in turn passes it to a summation block 62 via signal 60. The output of summation block 62, which is initially equivalent to the input, may then be sent to a first actuator 66 via signal 64. The outputs $C_1$ and $C_2$ of first actuator 66, which are indicated by signals 68 and 70, may be measured and sent to an adaptive cutoff controller 78 via signals 74 and 76, respectively. Examples of those outputs may include but are not limited to the pressure of the fluid passing through the valve and the flow rate of the fluid passing through the valve. Such outputs are typically limited in size by maximum constraints and are independent of each other. As used herein, "output constraint" refers to the maximum allowable value of a particular output. It is understood that first actuator 66 may have any number of independent outputs. For example it could have one output or more than two outputs rather than two outputs.

The output of summation block 62 may also be sent to adaptive cutoff controller 78, which reads $C_1$ and $C_2$, calculates input/output response slopes for first actuator 66, and calculates the maximum input for each of those slopes. It then determines which of the maximum input values is the smallest and equates that smallest maximum input value to the input constraint. As used herein, the "input constraint" refers to the maximum input that first actuator 66 can handle given its output constraints.

Figure 3:
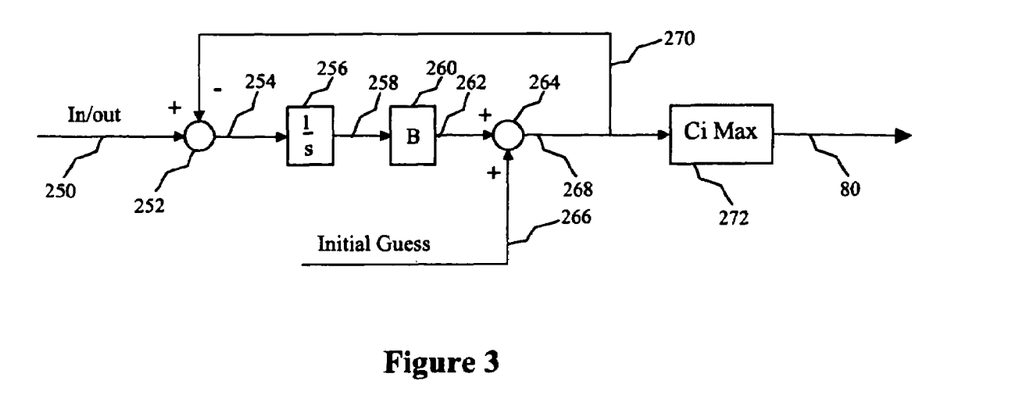
FIG. 3 is a schematic diagram showing in detail one embodiment of an adaptive cutoff controller of the control system depicted in FIG. 2.
Figure 4:
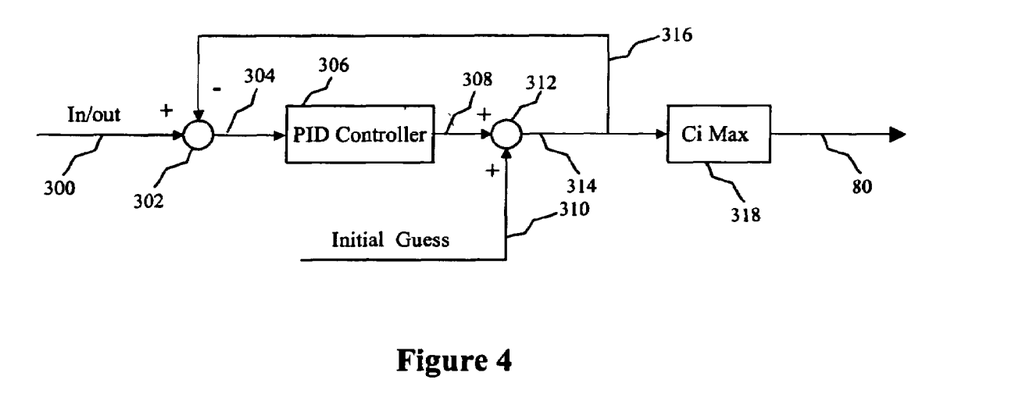
FIG. 4 is a schematic diagram showing in detail another embodiment of an adaptive cutoff controller of the control system depicted in FIG. 2.
Figure 5:
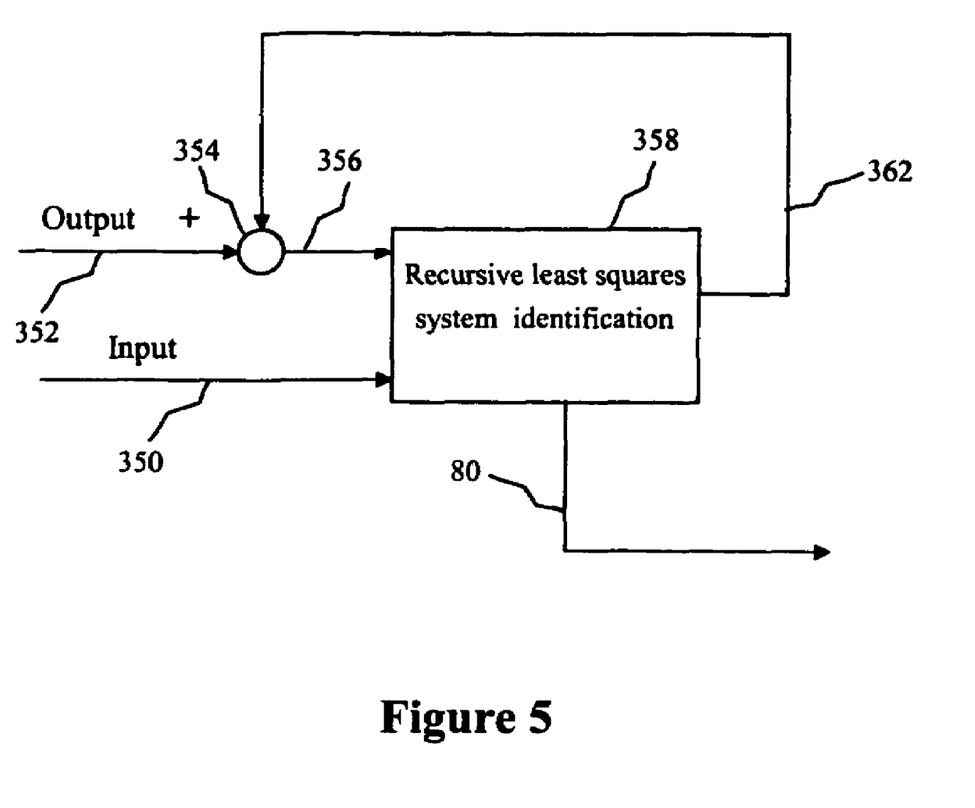
FIG. 5 is a schematic diagram showing in detail yet another embodiment of an adaptive cutoff controller of the control system depicted in FIG. 2.

FIGS. 3-5 illustrate alternate embodiments of adaptive cutoff controller 78. As shown in FIG. 3, the adaptive cutoff controller may include an integral controller, which is well known in the art. For each output received from first actuator 66, an input/output response slope may be calculated and sent to a summation block 252 via signal 250. At summation block 252, a signal 270 may be subtracted from the input/output response slope. That signal 270 is first equivalent to an initial guess of the input/output constraint, which may be provided to the adaptive cutoff controller by a user. The output of summation block 252 may be sent via signal 254 to an integral block 256 where it is multiplied by 1/s, which is the Laplace transform representation of integration, and it may then be sent via signal 258 to a gain block 260 where it is multiplied by a constant B. The resulting output of gain block 260 may be sent via signal 262 to another summation block 252 where it is summed with the initial guess signal 266. The output signal 268 of summation block 264, which represents the determined input/output ratio may be sent back to summation block 252 via signal 270. The adaptive cutoff controller may further determine the smallest input by multiplying the determined input/output ratio by $C_i$ Max as indicated by block 272 and then setting the result equivalent to the input constraint. The input constraint may then be sent to cutoff rerouter 58 via signal 80 (also shown in FIG. 2).

FIG. 4 depicts another embodiment in which the adaptive cutoff controller may include a PID (proportional-integral-derivative) controller, which is well known in the art. An input/output response slope may be calculated for each output received from the first actuator and may then be sent to a summation block 302 via signal 300 where a signal 316 is subtracted from the input/output response slope. The signal 316 is first equivalent to an initial guess of the input constraint that may be inputted into the adaptive cutoff controller by a user. The output of summation block 302 may be sent via signal 304 to a PID controller 306. The output of PID controller 306 may then be sent via signal 308 to a summation block 312 where it is summed with the initial guess signal 310. The output signal 314 of summation block 312, which represents the determined input/output ratio, may be sent back to summation block 302 via signal 316. The adaptive cutoff controller may further determine the smallest input by multiplying the determined input/output ratio by $C_i$ Max and setting the result equivalent to the input constraint. The input constraint may then be sent to cutoff rerouter 58 via signal 80 (also shown in FIG. 2).

In yet another embodiment depicted in FIG. 5, the adaptive cutoff controller may include a recursive least squares system identification controller 358. In this case, the input may be directly sent to controller 358 via a signal 350 while each output of the actuator is separately sent to a summation block 354 via signal 352. Each output of controller 358 may further be sent to summation block 354 via signal 362 where it is subtracted from the corresponding output of the actuator. The output of controller 358 represents the estimated output from the model using the current input. The adaptive cutoff controller may also determine the largest input allowable to maintain the constraint $C_i$ Max and set it equivalent to the input constraint, which may be sent to cutoff rerouter 358 via signal 80, as shown in FIG. 2.

In addition to being sent to adaptive cutoff controller 78, outputs $C_1$ and $C_2$ may be sent to respective PID controller loops 90 and 122. That is, output $C_1$ may be sent via signal 82 to a summation block 86 where it is subtracted from the corresponding output constraint $C_1$ Max of first actuator 66, which is sent to summation block 86 via signal 84. The output of summation block 86 may then be sent via signal 88 to an integral portion of PID controller 90, which comprises an integral block 92 and a gain block 94. It may be further sent to the proportional portion of PID controller 90 as represented by block 96 and to a derivative portion of the PID controller 90 as represented by derivative block 98 and gain block 100. However, as indicated by block 102, if the output $C_1$ is less than the output constraint $C_1$ Max, the output of summation block 86 and the output of integral gain block 94 may be set to zero via signals 104 and 106, respectively. The outputs of the integral, proportional, and derivative portions of PID controller 90 may then be summed as indicated by summation block 108. The result of this summation may be sent to yet another summation block 112 and represents the amount by which to offset (i.e., decrease) the input when the output $C_1$ of first actuator 66 is greater than the output constraint $C_1$ Max.

Like output $C_1$, output $C_2$ may be sent to a summation block 118 via signal 114. Also, the corresponding output constraint $C_2$ Max of first actuator 66 may be sent to summation block 118 via signal 116. At summation block 118, output $C_2$ may be subtracted from output constraint $C_2$ Max. The output of summation block 118 may then be sent via signal 120 to an integral portion of PID controller 112, which comprises an integral block 123 and a gain block 124. It may further be sent to the proportional portion of PID controller 122 as represented by block 126 and to a derivative portion of the PID controller 122 as represented by derivative block 128 and gain block 130. However, as indicated by block 131, if the output $C_2$ is less than the output constraint $C_2$ Max, the output of summation block 118 and the output of integral gain block 124 may be set to zero via signals 133 and 135, respectively. The outputs of the integral, proportional, and derivative portions of PID controller 122 may then be summed as indicated by summation block 137. The result of this summation may be sent to summation block 112 via signal 132 and represents the amount by which to offset (i.e., decrease) the input when the output $C_2$ of the first actuator is greater than the output constraint $C_2$ Max. Therefore, the offset amount generated by PID controller 90 and the offset amount generated by PID controller 122, both of which are negative numbers, may be summed at summation block 112. The output of summation block 112 may then be sent to summation block 62 via signal 134 where it can be summed with at least a portion of the input received from cutoff rerouter 58, thereby decreasing the input.

One function of cutoff rerouter 58 may be to determine if the input received from the main control system is greater than the input constraint determined by adaptive cutoff controller 78. If not, it sends the entire input to summation block 62 via signal 60, allowing it to be summed with signal 64, which in effect may decrease the input before it is sent to first actuator 66 via signal 64. On the other hand, if the input received from the main control system is greater than the input constraint, a portion of the input equivalent to the difference between the input and the input constraint may be diverted to second actuator control system 54. In particular, this portion of the input and the total offset amount from summation block 112 may be sent via signals 114 and 136, respectively, to a summation block 140 where the difference between the two is calculated (since the offset amount is a negative number) and sent via signal 142 to a transfer function block 144 belonging to second actuator control system 54. Moreover, cutoff rerouter 58 may send the undiverted portion of the input to summation block 62 via signal 60.

At transfer function block 144, the input to second actuator control system 54 may be modified by a transfer function to tune the second actuator relative to the first actuator, making the actuators have approximately the same response times. In one embodiment, the transfer function may be a conversion gain. The modified input may then be sent to cutoff rerouter 148 via signal 146. The remainder of second actuator control system 54 operates in a similar manner as first actuator control system 52. In particular, cutoff rerouter 148 sends the input to a summation block 152 via signal 150. The output of summation block 152, which is initially equivalent to the input, may then be sent to a second actuator 156 via signal 154.

The outputs $C_3$ and $C_4$ of second actuator 156, which are indicated by signals 158 and 160, may be measured and sent to an adaptive cutoff controller 168 via signals 164 and 166, respectively. Examples of those outputs may include but are not limited to the pressure of the fluid passing through the valve and the flow rate of the fluid passing through the valve. Such outputs are typically limited in size by maximum constraints, i.e., output constraints, and are independent of each other. It is understood that second actuator 156 may have any number of independent outputs. For example it could have one output or more than two outputs rather than two outputs.

The output of summation block 152 may also be sent to adaptive cutoff controller 168, which reads $C_3$ and $C_4$, calculates input/output response slopes for second actuator 156, and calculates the maximum input for each of those slopes. It then determines which of the maximum input values is the smallest and equates that smallest maximum input value to the input constraint. Alternate embodiments of adaptive cutoff controller 168 are depicted in FIGS. 3-5, which have been previously described in detail.

In addition to being sent to adaptive cutoff controller 168, outputs $C_3$ and $C_4$ may be sent to respective PID controller loops 180 and 209. That is, output $C_3$ may be sent via signal 172 to a summation block 176 where it is subtracted from the corresponding output constraint $C_3$ Max of second actuator 156, which is sent to summation block 176 via signal 174. The output of summation block 176 may then be sent via signal 178 to an integral portion of PID controller 180, which comprises an integral block 182 and a gain block 184. It may further be sent to the proportional portion of PID controller 180 as represented by block 186 and to a derivative portion of the PID controller 180 as represented by derivative block 188 and gain block 190. However, as indicated by block 192, if the output $C_3$ is less than the output constraint $C_3$ Max, the output of summation block 176 and the output of integral gain block 184 may be set to zero via signals 194 and 196, respectively. The outputs of the integral, proportional, and derivative portions of PID controller 180 may then be summed as indicated by summation block 198. The result of this summation may be sent to yet another summation block 202 and represents the amount by which to offset (i.e., decrease) the input when the output $C_3$ of second actuator 156 is greater than the output constraint $C_3$ Max.

Like output $C_3$, output $C_4$ may be sent to a summation block 208 via signal 204. Also, the corresponding output constraint $C_4$ Max of second actuator 156 may be sent to summation block 208 via signal 206. At summation block 208, output $C_4$ may be subtracted from output constraint $C_4$ Max. The output of summation block 208 may then be sent via signal 210 to an integral portion of PID controller 209, which comprises an integral block 212 and a gain block 214. It may further be sent to the proportional portion of PID controller 209 as represented by block 216 and to a derivative portion of the PID controller 209 as represented by derivative block 218 and gain block 220. However, as indicated by block 211, if the output $C_4$ is less than the output constraint $C_4$ Max, the output of summation block 210 and the output of integral gain block 214 may be set to zero via signals 213 and 215, respectively. The outputs of the integral, proportional, and derivative portions of PID controller 209 may then be summed as indicated by summation block 221. The result of this summation may be sent to summation block 202 via signal 222 and represents the amount by which to offset (i.e., decrease) the input when the output $C_4$ of second actuator 156 is greater than the output constraint $C_4$ Max. Therefore, the offset amount generated by PID controller 180 and the offset amount generated by PID controller 209, both of which are negative numbers, may be summed at summation block 202. The output of summation block 202 may then be sent to summation block 152 via signal 224 where it can be summed with at least a portion of the input received from cutoff rerouter 148, thereby decreasing the input.

One function of cutoff rerouter 148 may be to determine if the input received from the main control system is greater than the input constraint determined by adaptive cutoff controller 168. If not, it sends the entire input to summation block 152 via signal 150, allowing it to be summed with signal 224, which in effect may decrease the input before it is sent to second actuator 156 via signal 154. On the other hand, if the input received from the main control system is not greater than the input constraint, a portion of the input equivalent to the difference between the input and the input constraint may be diverted to a third actuator control system (not shown). In particular, this portion of the input and the total offset amount from summation block 224 may be sent via signals 228 and 226, respectively, to a summation block 230 where the difference between the two is calculated (since the offset amount is a negative number) and sent via signal 232 to a transfer function block (not shown) belonging to the third actuator control system. Moreover, cutoff rerouter 58 may send the undiverted portion of the input to summation block 152 via signal 150.

The process control system described above for second actuator 156 may be repeated for any additional actuators in sequence with second actuator 156 such that a portion of the input is always diverted to the subsequent actuator when an input constraint of the current actuator is exceeded. In an embodiment, all of the actuators, i.e., valves of the exemplary process shown in FIG. 1 may become saturated such that they all receive inputs equivalent to their input constraints. In this case, the control system may lower other drive signals to balance the system. For example, if all of the actuators reach the maximum pressure of 4,000 psi, the control system may reduce the pump rate of the nitrogen until the pumping and heating balance each other.

Figure 6:
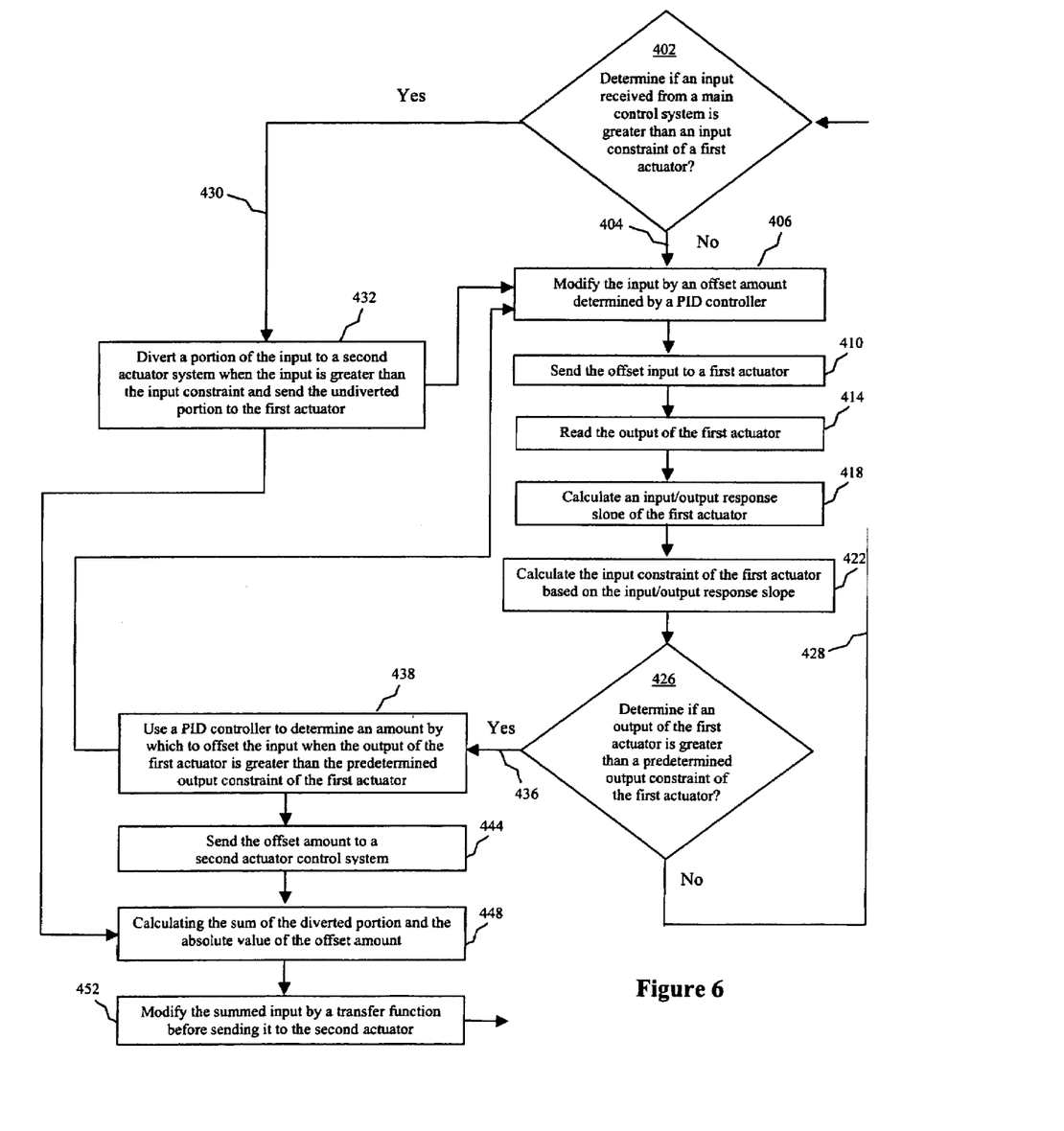
FIG. 6 is a flowchart showing the steps involved in controlling multiple actuators having independent constraints.

Turning to FIG. 6, a flowchart illustrates the steps that an information handling system may follow to operate the internal control system of FIG. 2. The information handling system may include a processor, memory accessible by the processor, nonvolatile storage area accessible by the processor, and logics for performing each of the steps shown in FIG. 6. Processing commences at decision 402 where it is determined if an input received from a main control system is greater than an input constraint of a first actuator. If the input exceeds the input constraint, decision 402 branches to "Yes" branch 430, which leads to step 432. In step 432, a portion of the input equivalent to the difference between the input and the input constraint is. diverted to a second actuator system and the undiverted portion is sent to a first actuator. Step 432 then branches to both step 406 and step 448, which are described below.

If the input does not exceed the input constraint, decision 402 branches to "No" branch 404, which also leads to step 406. In step 406, the input (may be a portion of the original input received from a main control system) being sent to the first actuator is modified by an offset amount determined by a PID controller. The resulting offset input is then sent to a first actuator as shown in step 410. Next, each output of the first actuator is read as shown in step 414, allowing the input/output response slope of the first actuator to be calculated for each output, as shown in step 418. The input constraint may then be determined by calculating the maximum input value for each input/output response slope and setting the input constraint equivalent to the smallest maximum input value, as shown in step 422.

Next, at decision 426, a determination is made as to whether an output of the first actuator is greater than a predetermined output constraint of the first actuator. Decision 426 is made with respect to each output of the first actuator. The "No" branch 428 of decision 426 then leads to aforementioned decision 402. In addition, the "Yes" branch 436 of decision 426 leads to step 438 whereupon a PID controller is used to determine an amount by which to offset the input, thereby decreasing it to a value equal to or less than the output constraint. Step 438 branches to both steps 406 and 444. In step 444, the offset amount is sent to a second actuator control system, followed by calculating the sum of the diverted portion of the input and the absolute value of the offset amount, as shown in step 448. The calculated summed input is then modified by a transfer function before being sent to the second actuator, as shown in step 452. Step 452 can then lead to another flowchart for the second actuator control system that is similar to the flowchart depicted in FIG. 6, and that flowchart can be connected to as many flowcharts as there are actuator control systems.

EXAMPLES

The invention having been generally described, the following examples are given as particular embodiments of the invention and to demonstrate the practice and advantages thereof. It is understood that the examples are given by way of illustration and are not intended to limit the specification or the claims to follow in any manner.

FIGS. 7-10 illustrate different operations of the heating unit of a nitrogen pumping system like that shown in FIG. 1 using the actuator control system described in this application. Each figure plots various parameters of the heating unit as a function of time. More specifically, in each figure, line 500 represents the change in pressure of the overall system, line 502 represents the change in the position of the cryo valve (i.e., the second actuator), line 504 represents the change in the cryo valve pressure, line 506 represents the change in the position of the hydraulic heater valve (i.e., the first actuator), and line 508 represents the change in the hydraulic heater valve pressure. Further, line 510 represents the nitrogen rate in standard cubic feet per minute (scfm), and line 512 represents the output temperature, both of which are the main control parameters for this system. The pressure of each valve is one of the constraints of the control system and should be maintained at less than or equal to 4,000 psi.

Figure 7:
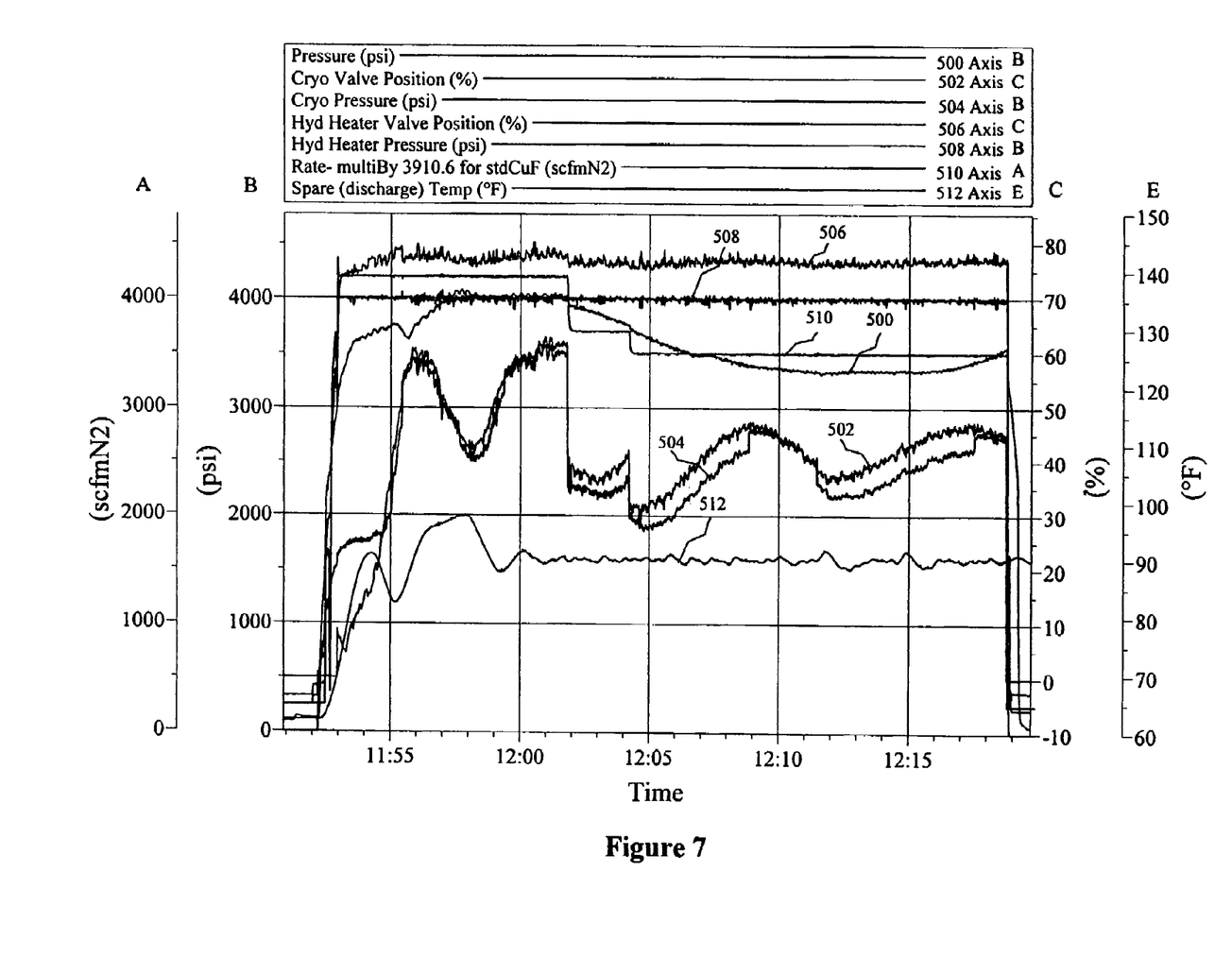
FIGS. 7-10 illustrate the operation of the process shown in FIG. 1 using an embodiment of the control system described herein, wherein various parameters such as valve positions are plotted as a function of time.
Figure 8:
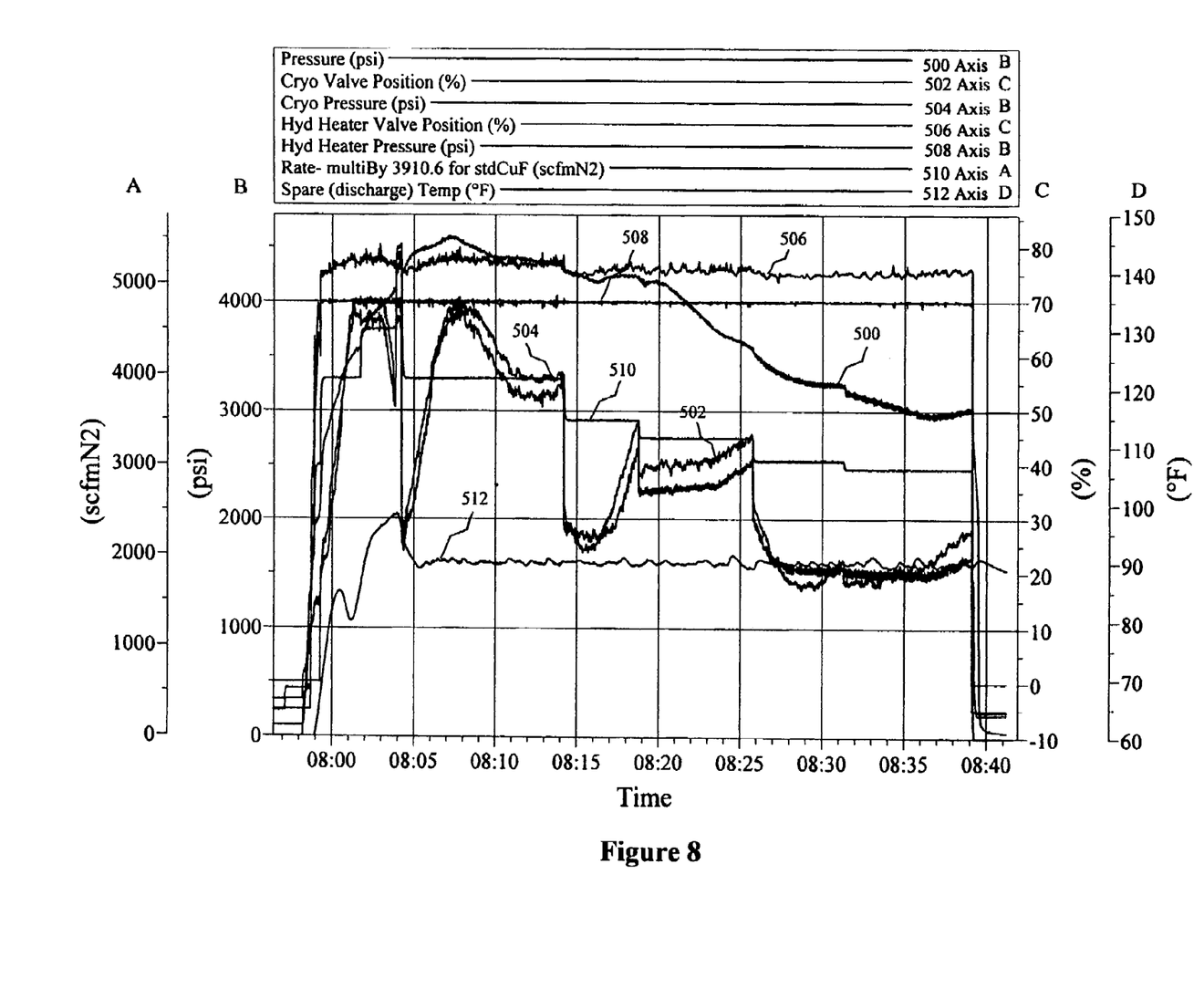
Figure 9:
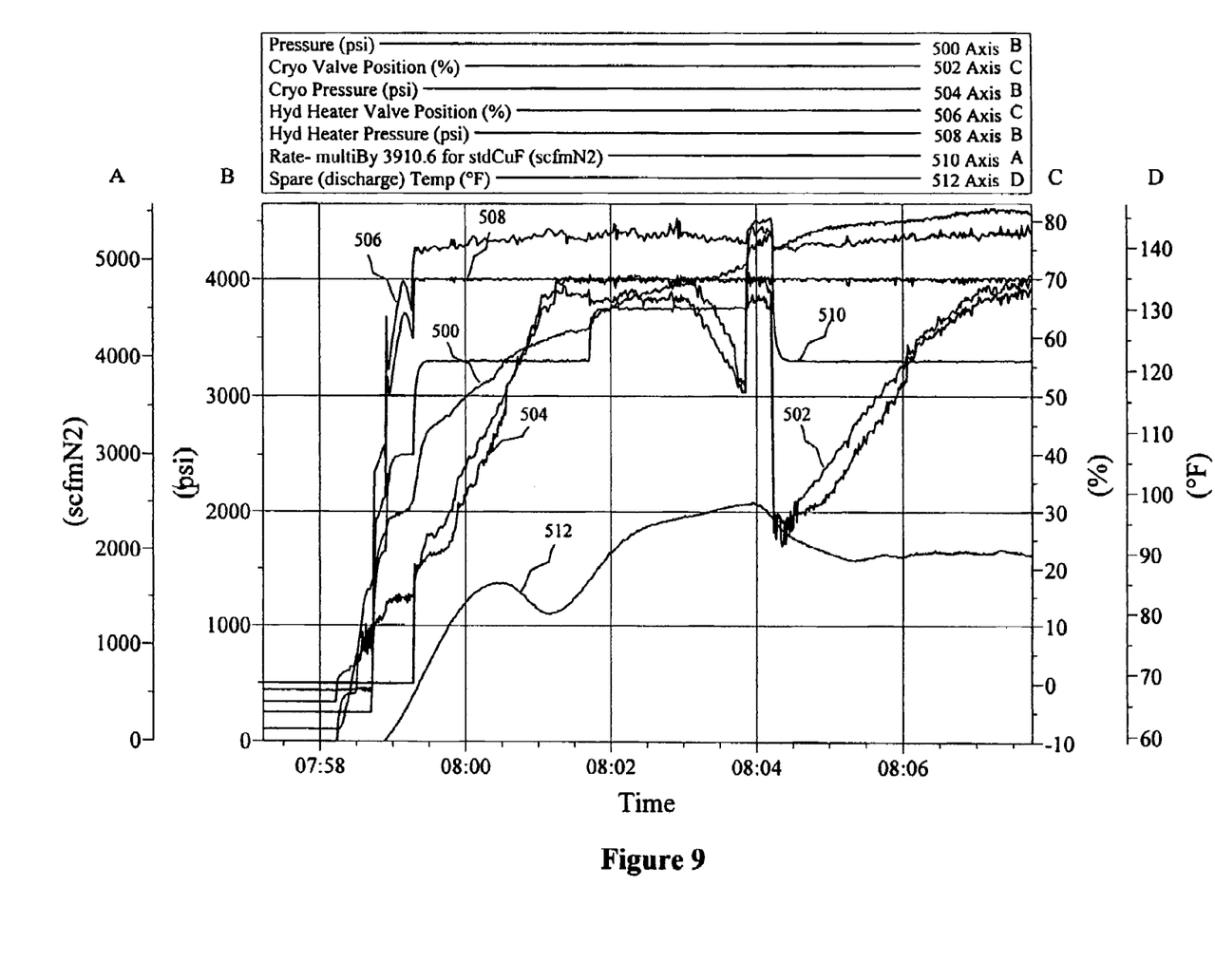

FIG. 7 depicts one example of the operation of the heating unit. In FIG. 7, the maximum pressure in the hydraulic heater valve (line 508) was 4,000 psi, which is the saturation point of the valve. At this point, the input was diverted to the cryo valve. The two valves had little interaction between them due to the use of the adaptive cutoff controller. FIG. 8 depicts another example of the operation of the heating unit. Both valves reached their saturation points at 4,000 psi constraint at approximately 8:01 (minutes:seconds). FIG. 9 shows a detailed view of a portion of FIG. 8 during the time period of 7:57 to 8:07. While the position of the hydraulic heater experienced some motion, its pressure was maintained at 4,000 psi. The position of the valve relative to the pressure produced changes in the system due to interactions with the underlying system. The adaptive cutoff controller followed those changes without affecting the cryo valve in a detrimental way.

Figure 10:
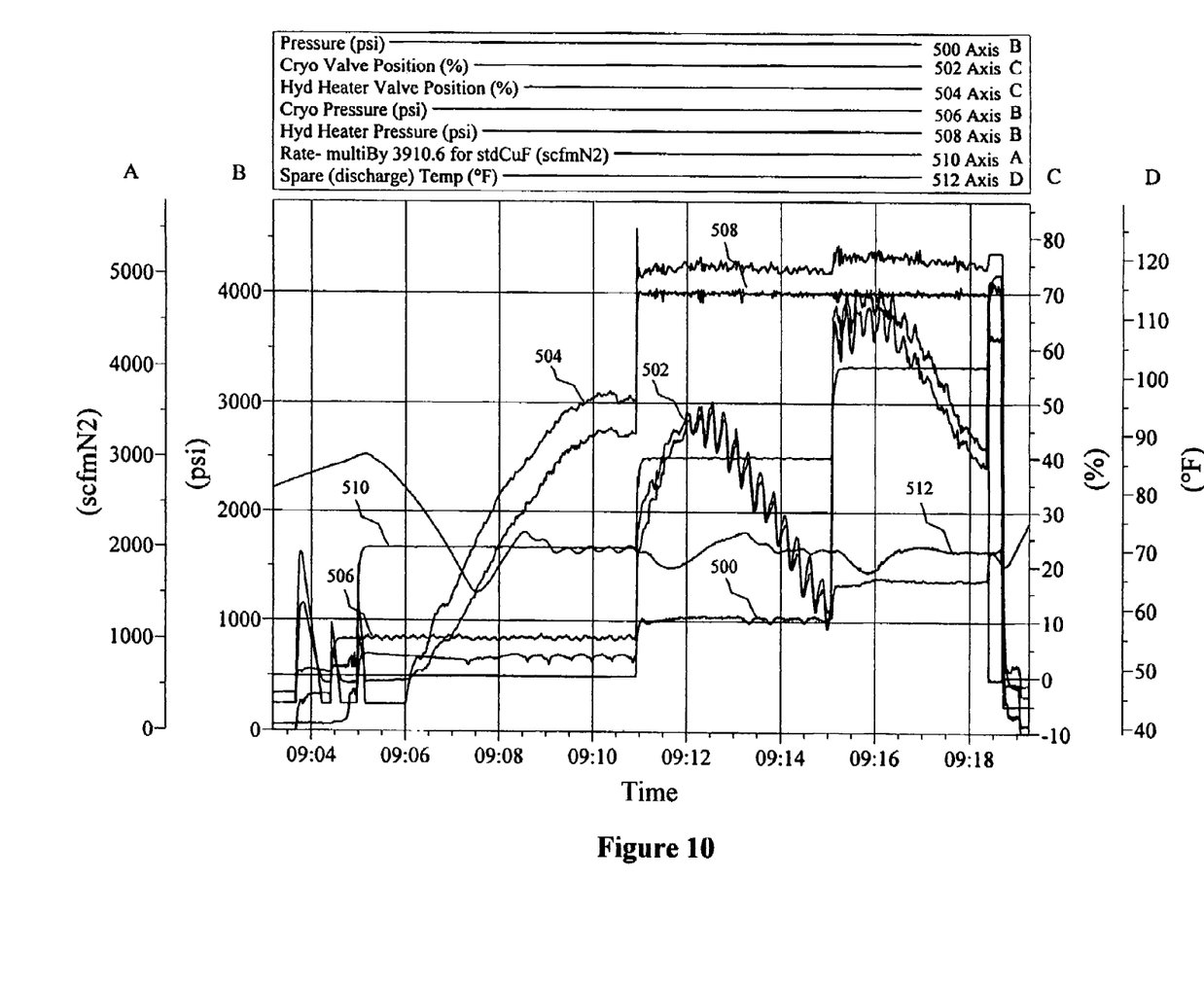

FIG. 10 illustrates yet another example of the operation of the heating unit with the multiple actuators working together. At approximately 9:11 the energy required for the heat build increased, causing the input to the hydraulic heater valve to hit its maximum allowable pressure within a few seconds. Once the hydraulic heater valve became saturated at its pressure constraint of 4,000 psi, the input signal from the temperature controller was diverted to the cryo valve. As a result of this diversion, there appeared to only be one actuator from the temperature controller's point of view. Consequently, the performance of the control system was improved. FIG. 10 also shows that when the hydraulic heater valve first became saturated, its position spiked above 81%, leading to a pressure reading greater than 4,000 psi. During this spike, the PID controller for assisting in the control of the pressure reduced the input to the hydraulic heater valve until the adaptive cutoff controller could properly determine the cutoff point for the input.

While exemplary embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the exemplary embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of controlling two or more actuators, comprising:
    sending an input received from a main electronic control system to a first actuator; and
    diverting a portion of the input to a second actuator when an input constraint of the first actuator is reached;
    wherein a size of the diverted portion of the input is equivalent to the difference between the input and the input constraint determined by an adaptive cutoff controller.

2. The method of claim 1 wherein the adaptive cutoff controller comprises an integral controller.

3. The method of claim 1 wherein the adaptive cutoff controller comprises a PID controller.

4. The method of claim 1 wherein the adaptive cutoff controller comprises a recursive least squares system.

5. A method of controlling two or more actuators, comprising:
    sending an input received from a main control system to a first actuator; and
    diverting a portion of the input to a second actuator when an input constraint of the first actuator is reached, wherein a size of the diverted portion of the input is equivalent to the difference between the input and the input constraint determined by an adaptive cutoff controller;
    wherein a signal being fed to the adaptive cutoff controller comprises the input divided by an output from the first actuator.

6. A method of controlling two or more actuators, comprising:
    sending an input received from a main control system to a first actuator; and
    diverting a portion of the input to a second actuator when an input constraint of the first actuator is reached; and
    using a PID controller to decrease the input being fed to the first actuator when an output of the first actuator is greater than a predetermined output constraint of the first actuator;
    wherein a size of the diverted portion of the input is equivalent to the difference between the input and the input constraint determined by an adaptive cutoff controller.

7. A method of controlling two or more actuators, comprising:
    sending an input received from a main control system to a first actuator;
    diverting a portion of the input to a second actuator when an input constraint of the first actuator is reached; and
    modifying the portion of the input by a transfer function before diverting it to the second actuator.

8. A method of controlling two or more actuators, comprising:
    sending an input received from a main control system to a first actuator; and
    diverting a portion of the input to a second actuator when an input constraint of the first actuator is reached;
    wherein the first and second actuators comprise throttle valves for heating a nitrogen line.

9. The method of claim 1 wherein the actuators have more than one input constraint.

10. The method of claim 1 wherein the actuators are arranged in sequence.

11. The method of claim 10 further comprising diverting one or more additional portions of the input to the subsequent actuators in the sequence when input constraints of the respective preceding actuators are reached.

12. A method of controlling two or more actuators, comprising:
    determining if an input received from a main electronic control system is greater than an input constraint of a first actuator;
    diverting a portion of the input to a second actuator when the input is greater than the input constraint; and
    sending an undiverted portion of the input to the first actuator.

13. The method of claim 12 wherein a size of the diverted portion of the input is equivalent to the difference between the input and the input constraint of the first actuator.

14. The method of claim 12 wherein a size of the undiverted portion is equivalent to the input constraint of the first actuator.

15. The method of claim 12 further comprising calculating an input/output response slope of the first actuator.

16. The method of claim 15 further comprising calculating the input constraint of the first actuator based on the input/output response slope.

17. A method of controlling two or more actuators, comprising:
    determining if an input received from a main control system is greater than an input constraint of a first actuator;
    diverting a portion of the input to a second actuator when the input is greater than the input constraint;
    sending an undiverted portion of the input to the first actuator; and
    determining if an output of the first actuator is greater than a predetermined output constraint of the first actuator.

18. A method of controlling two or more actuators, comprising:
    determining if an input received from a main control system is greater than an input constraint of a first actuator;
    diverting a portion of the input to a second actuator when the input is greater than the input constraint;
    sending an undiverted portion of the input to the first actuator; and determining an amount by which to offset the input being fed to the first actuator when the output of the first actuator is greater than the predetermined output constraint of the first actuator.

19. A method of controlling at least two actuators, comprising:

determining if an input received from a main electronic control system is greater than an input constraint of a first actuator;

diverting a portion of the input to a second actuator when the input is greater than the input constraint; and using an internal electronic control system that receives an input from a main control system to control said first and second actuators such that eigenvalues of the internal control system remain substantially constant during its operation.

* * * * *